United States Patent Office 2,795,570
Patented June 11, 1957

2,795,570

HALOGEN-CONTAINING VINYL POLYMERS STABILIZED WITH A METAL SALT OF A SEMI-ESTER OR SEMI-AMIDE OF A 1,2-ETHYLENE DICARBOXYLIC ACID

Otto Fuchs and Horst Elsner, Troisdorf, Germany, assignors to Dynamit-Actien-Gesellschaft vormals Alfred Nobel & Co., Troisdorf, near Cologne, Germany, a German company No Drawing. Application December 30, 1953,
Serial No. 401,362

Claims priority, application Germany January 2, 1953

10 Claims. (Cl. 260—45.75)

This invention relates to improvements in or relating to stabilised halogen-containing vinyl polymers or mixed polymers containing the same.

It is well known that halogen-containing vinyl polymers are not stable under the action of heat and light, but exhibit a tendency to split off hydrogen halide and to become discoloured.

In order to obviate this disadvantage, it is customary to add stabilisers to the polymers during their working up. Numerous substances of various chemical categories have already been proposed for this purpose, for example inorganic substances having an alkaline action, such as oxides, hydroxides and carbonates of the alkali and alkaline-earth metals and more particularly of lead. However, such substances have the disadvantage that they produce turbidity in the polymers and sometimes cause an acceleration of the splitting off of hydrogen halide owing to their basicity. In addition, metal salts of weak organic acids, for example of stearic acid, have been employed. Furthermore, organometallic tin salts, more particularly of maleic acid, have proved to be effective stabilisers, since the organometallic radical may be active as a dienophilic component and is capable of eliminating colour-deepening accumulations of double bonds. The organometallic tin salts, however, have the disadvantage inter alia that their decomposition products, which form at relatively high temperatures, are volatile and may be injurious to the health.

Finally, organometallic lead salts of $\alpha$:$\beta$-olefine dicarboxylic acids such as lead alkyl maleates and lead alkyl monohexyl maleates have also been proposed as stabilisers.

According to the present invention, there is provided a process for stabilizing vinyl polymers and mixed polymers containing vinyl polymers, in which one or more neutral or basic metal salts of semi-esters or semi-amides of 1,2-ethylene dicarboxylic acid, whose alcoholic or amino components contain at least 10 carbon atoms and not more than 20 carbon atoms, are added to the said polymers.

It has been found that the use of such stabilising agents is very helpful in preventing migration and exudation, and at the same time they are compatible with the polymers without turbidity. The alcohols and amines employed for the purposes of this invention are preferably aliphatic compounds. The salts can readily be prepared and do not decompose to form volatile toxic compounds even at relatively high temperatures. Because of their low cost, semi-esters and semi-amides of maleic acid and fumaric acid primarily come into consideration, and particularly those of maleic acid, since its semi-esters and semi-amides can very readily be produced from its anhydride. However, the derivatives of other 1:2-ethylene dicarboxylic acids, such as alkyl- and aryl-substituted maleic acid and fumaric acid derivatives, as also those of itaconic acid, citraconic acid and the like, may be successfully employed.

The salts of the corresponding semi-esters of cetyl alcohol also possess a very good stabilising action. All metals with the exception of metals of the first group of the periodic system, which give water-soluble salts, may be employed as the cation constituent. Naturally, for colourless polymerisation products, salts having coloured cations, such as copper, nickel, cobalt, iron, manganese or the like, will not be employed, but salts having colourless cations, such as cadmium, lead, zinc, calcium and the like are generally used. In some cases, mixed salts have proved advantageous. Of the series of semi-amides concerned, those having pentadecyl-, heptadecyl- and stearylamino components are particularly active.

The stabilisers described may be employed alone or in admixture with other stabilisers. They are distinguished by their particularly good compatibility with halogenous polyvinyl compounds and they act at the same time as hydrogen halide acceptors, as antioxidants and as lubricants. They are generally employed in additions of 0.3–2.0% by weight of the vinyl polymers. Since these compounds also have a plasticising action owing to their long-chain alcoholic and amino components, they may also be employed as plasticisers having a stabilising action. The use of salts of maleic acid, more especially as stabilisers, and of maleic acid esters as plasticisers is already known. Their stabilising action, however, is much lower than that of the semi-esters and semi-amides described.

Example 1

A mixture of 60 parts by weight of polyvinyl chloride (suspension polymer), 40 parts by weight of dioctyl phthalate and 1 part by weight of lead decyl maleate as a stabiliser was rolled at 140°–150° C. for a period of 15 minutes until a uniform skin was formed, which was finally drawn off as a foil. The foil was completely colourless and limpid. Longer rolling had no colouring effect. Subsequent heat treatment at a temperature of 175° C. did not produce any colour change after 60 minutes. A 300 kwh. exposure to ultra-violet rays did not produce any discoloration. In a comparative specimen containing no stabiliser, slight discoloration occurred after 15 minutes' thermal treatment, the colouring becoming yellowish-brown after 60 minutes. The U. V. light exposure produced dark brown colouring in the unstabilised specimen.

Example 2

The process described in Example 1 was adopted, but 0.6 part by weight of a mixed cadmium-lead-cetyl-decyl-maleate was employed. The heat treatment of the clear colourless foil only commenced to produce a scarcely perceptible yellowish colouring after 60 minutes, but exposure to light had no influence.

Example 3

The process adopted in Example 1 was adopted, but 0.3 part by weight of a mixed barium-zinc-dicyclopentadienyl-maleate was employed. Heat treatment and exposure to light had no colour-change effect on the clear colourless foil.

Example 4

The process described in Example 1 was adopted, but an emulsion polymer prestabilised with soda was employed as polyvinyl chloride and 0.9 part by weight of a mixed calcium-zinc-cetyl maleate was employed as a stabiliser. The clear colourless transparent foil rolled at 160° C. did not change in appearance after heat treatment and exposure to light. The comparative specimen containing no addition of stabiliser was also stable under exposure to light, but exhibited a weak brownish tint after heat treatment for 30 minutes, and a chocolate-brown colour after 60 minutes.

*Example 5*

Instead of the stabiliser mentioned in Example 4, 0.6 part by weight of calcium-dicyclopentadienyl-cetyl maleate was employed, and the process of Example 1 was followed. The same results were obtained as in Example 4.

*Example 6*

100 parts of polyvinyl chloride were uniformly mixed with 2 parts by weight of lead cetyl maleate and uniformly worked up on the roller for 3 minutes at a temperature of 160° C., and the product was finally drawn off as a foil. The foil was substantially colourless, and limpid, and exhibited only a weak yellowish lustre. A similarly treated foil containing no addition of stabiliser was coloured brown. In the thermal treatment, the stabilised specimen only exhibited a very slight yellow-brown tint after 60 minutes, while the unstabilised comparative specimen became a very dark brown after 15 minutes. On exposure to ultra-violet rays, the unstabilised comparative specimen very quickly became black, while the stabilised specimen only exhibited a very slight brownish tint after 300 kwh.

*Example 7*

The process of Example 6 was followed, but lead heptadecylamide maleate was employed as a stabiliser. Similar stabilising effects were obtained.

*Example 8*

The process of Example 6 was adopted, but lead dicyclopentadienyl maleate was employed. After heat treatment for 1 hour, only a very slightly yellowish coloration was exhibited and no perceptible discoloration was found after exposure to light.

We claim:

1. A stabilized polymeric composition including a halogen-containing vinyl polymer and at least one stabilizing agent selected from the group consisting of water insoluble neutral and basic normal metal salts of semi-esters and semi-amides of 1,2-ethylene dicarboxylic acids, wherein the alcoholic and amino components are selected from the group consisting of straight chain saturated aliphatic monohydric alcohols and mono-amines containing between 10 and 20 carbon atoms and alicyclic monohydric alcohols containing between 10 and 20 carbon atoms.

2. A composition as defined in claim 1 wherein the stabilizing agent is a lead salt.

3. A composition as defined in claim 1 wherein the stabilizing agent is a cadmium salt.

4. A composition as defined in claim 1 wherein the stabilizing agent is a barium salt.

5. A composition as defined in claim 1 wherein the stabilizing agent is a zinc salt.

6. A composition as defined in claim 1 wherein the stabilizing agent is a calcium salt.

7. A composition as defined in claim 1 wherein the stabilizing agent is a salt of maleic caid.

8. A composition as defined in claim 1 wherein the stabilizing agent is a salt of a semi-ester of decyl alcohol.

9. A composition as defined in claim 1 wherein the stabilizing agent is a salt of a semi-ester of cetyl alcohol.

10. A composition as defined in claim 1 wherein the stabilizing agent is a salt of a semi-ester of dicyclopentadienyl alcohol.

References Cited in the file of this patent

UNITED STATES PATENTS 2,561,044     Baer  ---------------- July 17, 1951